United States Patent
Porte et al.

(10) Patent No.: US 6,772,857 B2
(45) Date of Patent: Aug. 10, 2004

(54) ACOUSTICALLY RESISTIVE LAYER FOR AN ACOUSTICAL ATTENUATION PANEL, PANEL USING SUCH A LAYER

(75) Inventors: Alain Porte, Colomiers (FR); Nathalie Pascal, Colomiers (FR); Sylvain Thezelais, Toulouse (FR); Eric Rambaud, Les Sorinieres (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/293,353

(22) Filed: Nov. 14, 2002

(65) Prior Publication Data
US 2004/0045766 A1 Mar. 11, 2004

(30) Foreign Application Priority Data
Sep. 10, 2002 (FR) .............................. 02 11193

(51) Int. Cl.[7] ......................... G10K 11/00; B64D 33/02; E04B 1/82
(52) U.S. Cl. ..................... 181/210; 181/214; 181/292; 244/1 N
(58) Field of Search ................................. 181/210, 214, 181/290, 292, 293, 294, 288; 244/1 N

(56) References Cited

U.S. PATENT DOCUMENTS

| 3,666,043 A | * | 5/1972 | Eschenburg ................. 181/214 |
| 3,937,590 A | * | 2/1976 | Mani ........................... 181/207 |
| 4,104,002 A | * | 8/1978 | Ehrich ......................... 181/222 |
| 4,161,231 A | * | 7/1979 | Wilkinson .................. 181/292 |
| 4,817,756 A | * | 4/1989 | Carr et al. .................. 181/214 |
| 5,445,861 A | * | 8/1995 | Newton et al. ............. 181/292 |
| 5,768,778 A | * | 6/1998 | Anderson et al. ........... 181/214 |
| 6,123,170 A | * | 9/2000 | Porte et al. ................. 181/214 |
| 6,176,964 B1 | * | 1/2001 | Parente et al. ............. 181/292 |
| 6,439,340 B1 | * | 8/2002 | Shirvan ...................... 181/292 |
| 6,607,625 B2 | * | 8/2003 | Andre et al. ............... 181/292 |

FOREIGN PATENT DOCUMENTS

EP            572725 A1  * 12/1993    ........... F02C/7/045

* cited by examiner

Primary Examiner—Shih-Yung Hsieh
Assistant Examiner—Edgardo San Martin
(74) Attorney, Agent, or Firm—Young & Thompson

(57) ABSTRACT

An acoustically resistive layer for an acoustic attenuation panel (22) forming a conduit in which there is an aerodynamic flow (18), adapted particularly for an aircraft turbo jet engine. The panel has at least one acoustically resistive layer (24), at least one porous structure (26) and a reflector (28) disposed opposite the incident wave. The acoustically resistive layer (24) is constituted by strips (30) disposed in the direction of the flow (18), interconnected by a plurality of splints (32) ensuring the absorption of force, particularly radially, the splints (32) having very small surfaces ensuring the continuity of the homogeneous character of the quantity of open surface of the acoustically resistive layer thus formed.

14 Claims, 4 Drawing Sheets

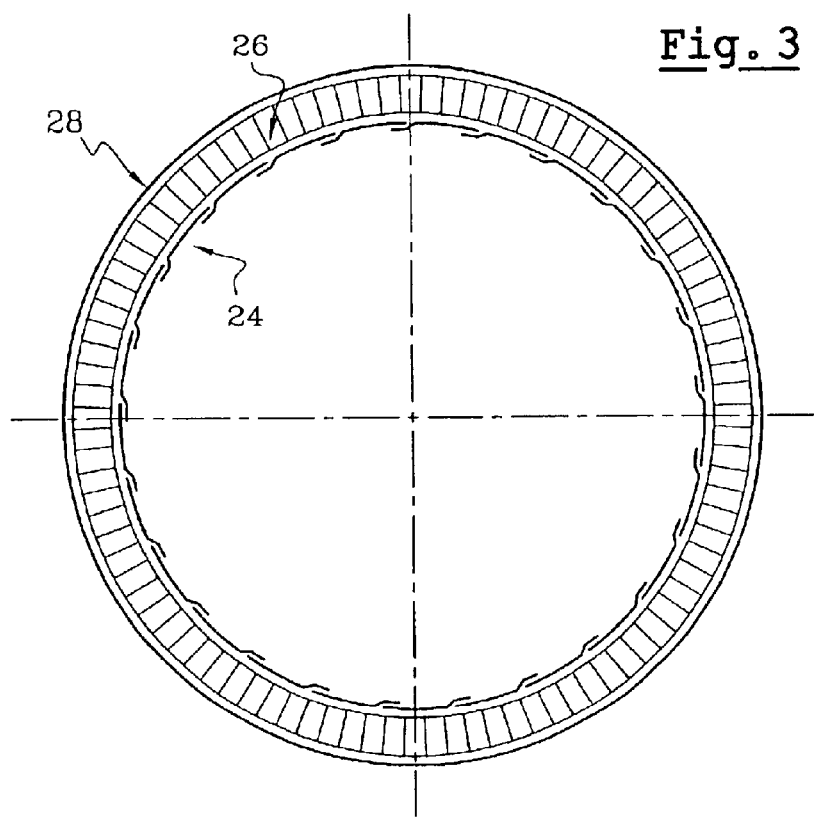
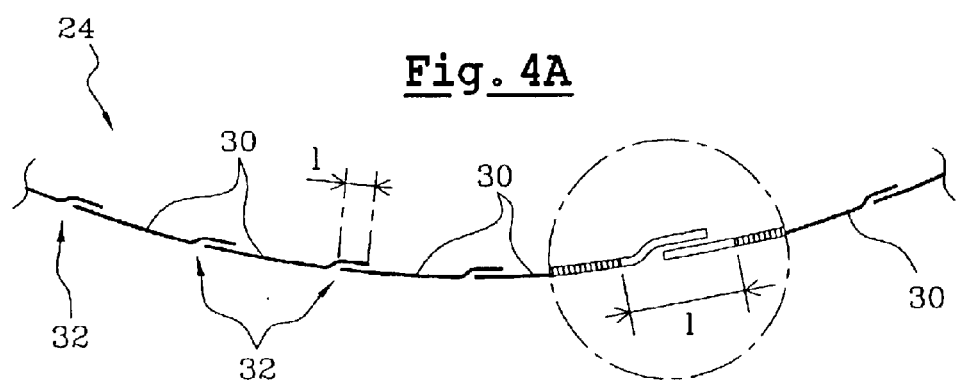

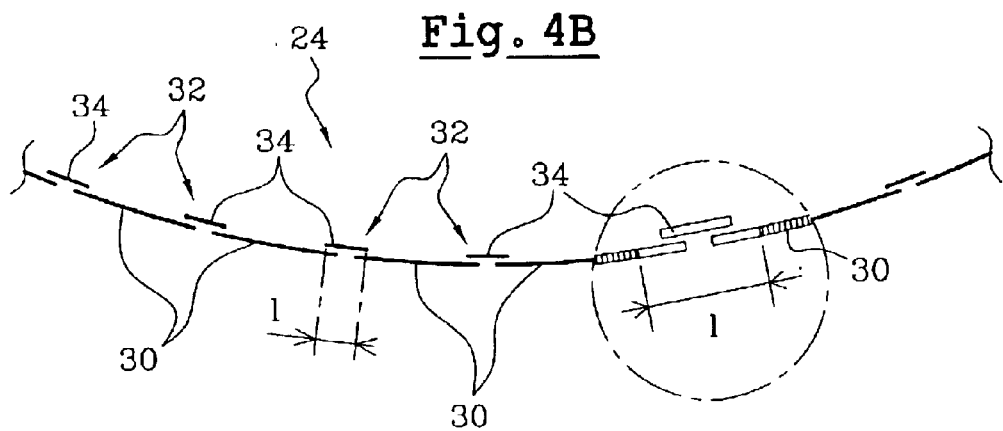
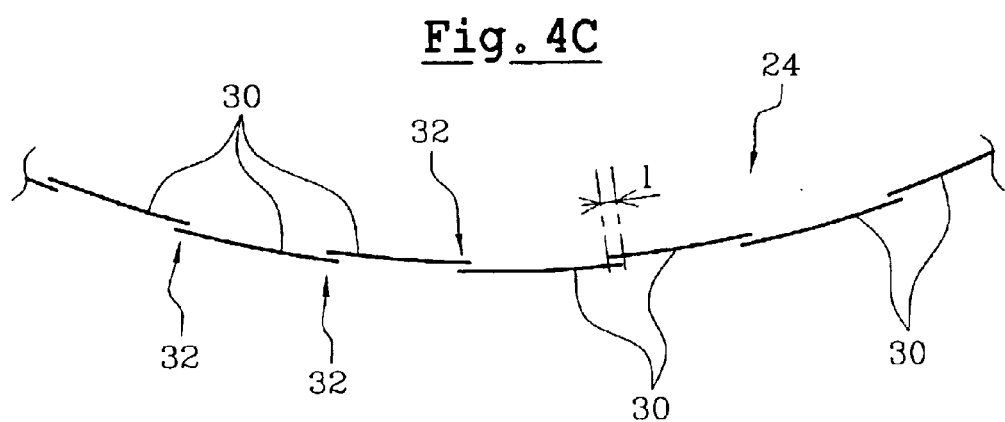

US 6,772,857 B2

ACOUSTICALLY RESISTIVE LAYER FOR AN ACOUSTICAL ATTENUATION PANEL, PANEL USING SUCH A LAYER

FIELD OF THE INVENTION

The present invention relates to an acoustically resistive layer for an acoustical attenuation panel, more particularly adapted for panels in the form of conduits for aircraft jet engines.

BACKGROUND OF THE INVENTION

Acoustic attenuation panels are more particularly adapted to be mounted in the walls of nacelles of aircraft jet engines, in the frames of the reactors or in conduits which must be soundproofed.

In practice, this type of panel includes a cellular core, such as a honeycomb structure covered, on the incident sound wave side, with an acoustically resistive layer, and, on the opposite side, with a rear reflector. As a modification, this type of panel can comprise a superposition of honeycomb structures separated by acoustically resistive layers.

An acoustically resistive layer is a porous structure with a dissipating role, which is to say partially transforming the acoustic energy of the sound wave passing through it, into heat.

This acoustically resistive layer is characterized particularly by a quantity of open surface which varies essentially as a function, on the one hand, of the engine and, more particularly, of its pressure field, and, on the other hand, on the components constituting said layer.

According to a first known embodiment, this resistive layer in the form of a cylinder, is obtained from sheet metal forming portions of a cylinder, generally two or four, interconnected along generatrices of the cylinder by splints. These latter constitute connection regions in which the portions can be superposed and are connected by means of suitable connectors, such as by cementing or riveting, which are perfectly sealed with a quantity of open surface equal to zero. To obtain a structure having suitable mechanical characteristics, the splints have relatively large surfaces.

It is known that these splints influence in an important way the acoustical characteristics of the resistive layer, because of the inhomogeneity of the overall surface, particularly in line with connection regions. Thus, these zones are inactive, and do not let sound waves pass in a manner partially to transform the acoustic energy of the sound wave into heat.

The patent FR-2.698.910 mentions this phenomenon and proposes to reduce the number of splints, preferably to omit them. It also describes a way of making the resistive layer from a single metal sheet whose side edges are interconnected by a splint so as to form a cylinder.

Even if this embodiment permits reducing the surface of the inactive zones, it does not give complete satisfaction because there still remains a splint region.

To overcome this drawback, the applicant proposes in French patent application FR-2.767.411, a process for producing a resistive layer that has no splint, in which the resistive layer comprises a cloth structurally reinforced by filament winding. However, the practice of this process is relatively complicated to obtain satisfactory mechanical characteristics. Thus, the use of resins which form the mechanical connections between the different constituents, requires the monitoring of numerous parameters, particularly temperature and pressure, which is difficult to control in situ in a repeatable manner so as to obtain the same quality of cementing over time.

Another solution proposed by the applicant in French patent application FR-01.03227, consists in emplacing the acoustically resistive layer by winding from a porous material in the form of a strip.

This manner of proceeding not only permits avoiding inhomogeneous zones from an acoustic standpoint of the porous layer, as indicated above, in the usual technique of forming two half panels, but also eliminates the necessity of splinting, the winding of the porous layer being adapted to be used for placing other layers, namely the structural layer, the porous central core, the rear reflector, so as to produce a complete acoustic panel in one piece without splints.

The absence of splints permits increasing the effective acoustic surface of the panel, decreasing its mass and reducing the time and cost of production.

If such a panel produces acoustic shock absorption of good quality, this shock absorption is however not optimum. Thus, the physical characteristics of the resistive layer are homogeneous over all the extent of the panel and are predetermined as a function of the mean value of noise which it is desired to attenuate.

However, the different modes of propagation of sound waves change in the course of their propagation in the fan channel. Thus, certain modes are subject to strong attenuation whilst others, on the contrary, are practically unaffected by the acoustic panel. Moreover, the characteristics of the noise to be attenuated are different from one place to another in the channel. As a result, an acoustic attenuation panel of the type described above, while attenuating a limited number of modes, does not permit optimum absorption of noise.

Moreover, according to this embodiment, the edges of the wound strip are substantially perpendicular to the flow in the conduit so that the strip easily peels at its edge in contact with the aerodynamic flow. Thus, not only are the acoustic qualities of the panel degraded, but furthermore the panel itself degrades and must be changed, which implies cost of maintenance and down time of the aircraft.

All the solutions of the prior art have the common object of omitting splints or regions of connection so as to increase the effect of acoustic surface of the resistive layer.

OBJECT OF THE INVENTION

The present invention seeks to overcome the drawbacks of the prior art by providing an acoustically resistive layer for an acoustic attenuation panel having good mechanical characteristics and producing high quality acoustical damping.

SUMMARY OF THE INVENTION

To this end, the invention has for its object an acoustically resistive layer for an acoustic attenuation panel forming a conduit through which an aerodynamic flow passes, adapted for an aircraft jet engine, said panel comprising at least one acoustically resistive layer, at least one cellular structure and a reflector disposed on the side opposite the incident wave, characterized in that said acoustically resistive layer is constituted by strips disposed along the direction of said flow, interconnected by a plurality of splints ensuring strain relief, said splints having small surfaces relative to the surface of the strips so as to ensure the continuity of the homogeneous character of the quantity of open surface of the acoustically resistive layer thus formed.

By splint is meant a region of connection, inactive acoustically, between two adjacent strips which can be of any shape, for example by overlapping said strips or by using a junction strip, and of all natures, for example by cementing, riveting or the like.

According to a characteristic of the invention, the splints should have a width l at most equal to the smallest of the following values:

15 mm;

28% of the width of the strips.

In contrast to the prior art, which seeks to omit splints or connection means between the panels forming the acoustically resistive layer, the present invention seeks to multiply the number of splints. By multiplying their number, there is distributed over the largest number of regions, the absorption of mechanical force, particularly radially, so that contrary to the splints of the prior art which have relatively large surfaces for absorbing force, which necessarily alters the homogeneous character of the acoustically resistive layer, the connection zones according to the invention are very small surfaces which do not alter the homogeneous character of the acoustically resistive layer.

The small surface of each splint has the result of rendering said splints transparent to sound, which is to say that they substantially do not give rise to any disturbance in the processing of the sound waves to be attenuated, contrary to the splints of the prior art, whose large surfaces constitute inactive surfaces disturbing the processing of said waves.

According to this arrangement, the edges of the strips are disposed in the direction of the aerodynamic flow, so that they do not offer any impediment to said flow thereby limiting the risk of delamination.

According to a first embodiment, the splints are obtained by overlapping adjacent strips.

According to a second embodiment, the strips are juxtaposed and connected two by two by junction strips whose lateral edges are connected to the strips.

BRIEF DESCRIPTION OF THE DRAWINGS

Other characteristics and advantages will become apparent from the description which follows, of the invention, which description is given only by way of example, with reference to the accompanying drawings, in which:

FIG. 3 is a cross-sectional view in a plane perpendicular to the direction of flow of the air, of an acoustic attenuation panel in the shape of a conduit, FIG. 4A is a cross-sectional view on a plane perpendicular to the direction of air flow, of a resistive layer according to a first modification of the invention, FIG. 4B is a view in cross-section on a plane perpendicular to the direction of air flow, of a resistive layer according to a second modification of the invention, FIG. 4C is a view in cross-section on a plane perpendicular to the direction of air flow, of a resistive layer according to a third modification of the invention.

DETAILED DESCRIPTION OF THE INVENTION

Figure 1:
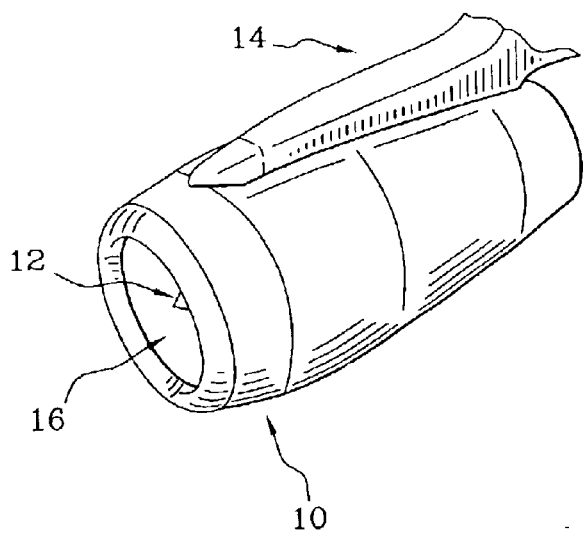
FIG. 1 is a perspective view of a nacelle of an aircraft turbo jet engine.
Figure 2:
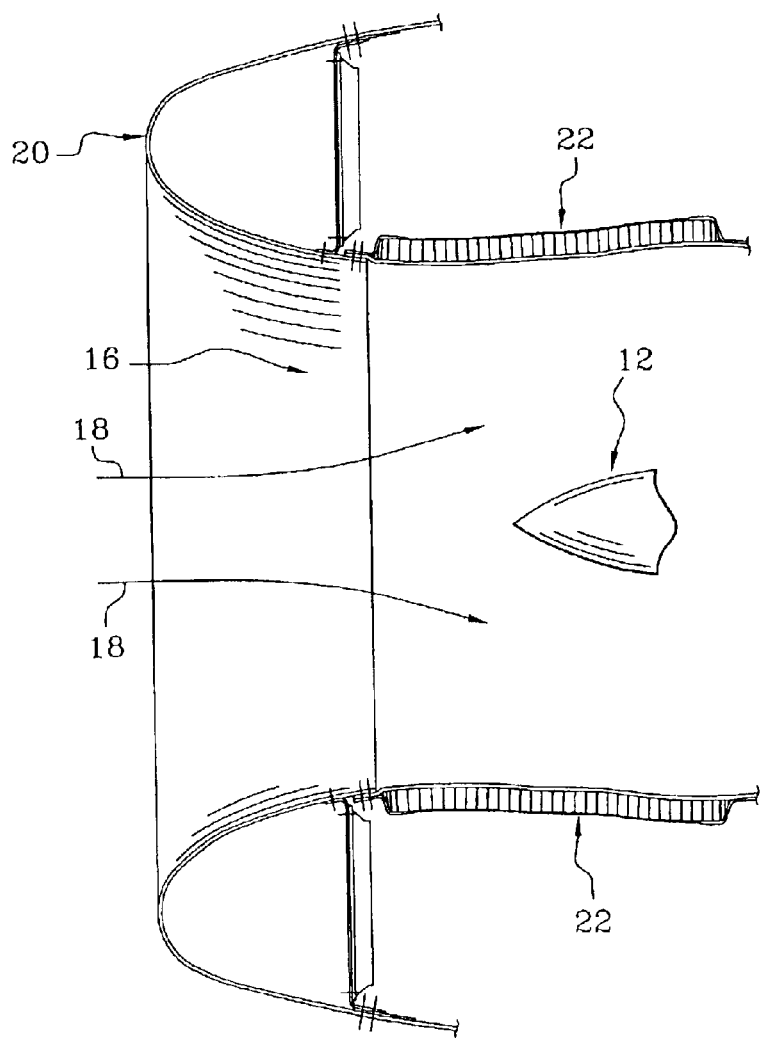
FIG. 2 is a longitudinal cross-sectional view of the nacelle of FIG. 1.

In FIG. 1, there is shown a nacelle 10 coaxially surrounding an engine or turbine 12, said nacelle being connected to a mast 14 on a wing (not shown). This nacelle 10 forms the interior of a conduit 16 in which circulates an aerodynamic fluid or air whose flow is shown by the arrows indicated at 18 in FIG. 2.

Upstream of this air conduit 16, the nacelle comprises an air inlet 20 having the function of ensuring the flow of air, on the one hand, toward the conduit 16, and, on the other hand, toward the outside of the nacelle 10.

This conduit 16 comprises on its surface an acoustic attenuation panel 22 which extends in part or entirely over the length of said conduit.

This acoustic attenuation panel 22 has generally a surface in contact with the air flow 18 which is non-cylindrical with an evolving section. Thus, the transverse sections have more or less circular shapes and the generatrices are not necessarily straight.

To simplify illustration, and for the purpose of clarity, the acoustic attenuation panel 22 will have a substantially cylindrical shape.

Figure 5:
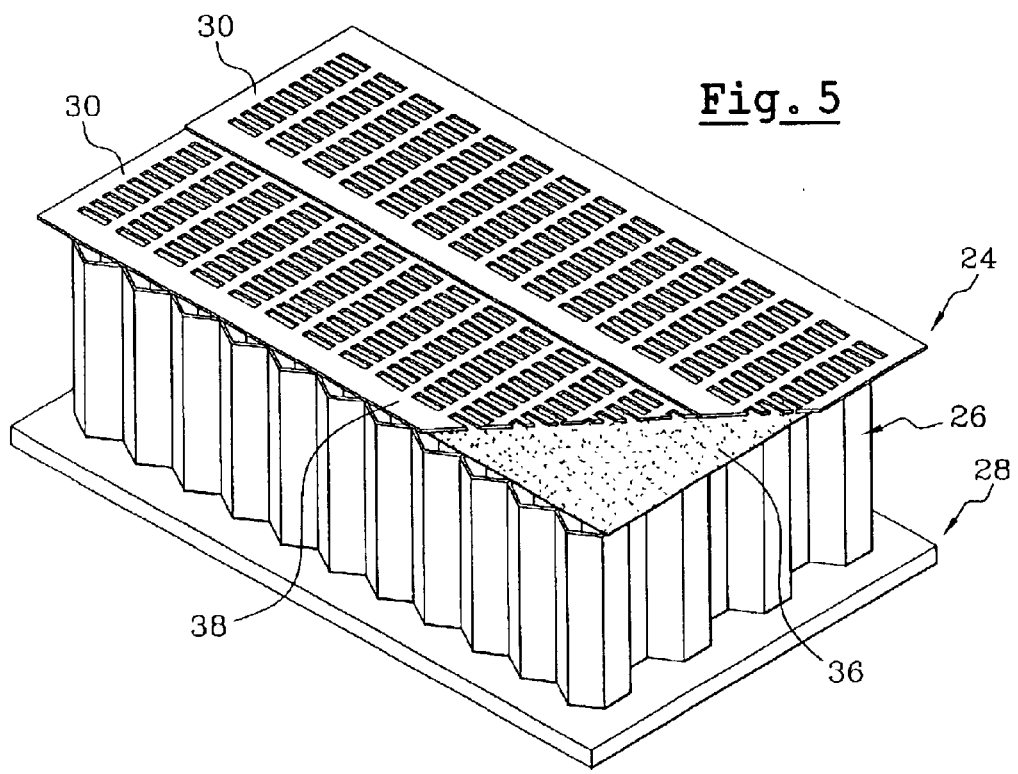
FIG. 5 is a perspective view showing in detail a portion of the acoustic attenuation panel according to the invention.

In a known manner, this acoustic attenuation panel 22 comprises, from the interior toward the exterior, as shown in FIGS. 3 and 5, an acoustically resistive layer 24, a cellular structure 26 and a reflector 28.

As a modification, it can comprise several cellular structures separated by acoustically resistive layers, in this case called septa.

As the case may be, the cellular structure 26 can be obtained from a flat panel shaped as a cylinder, of several flat panels shaped of cylindrical portions juxtaposed with each other, or of at least one wound strip.

Similarly, the reflector 28 can be made from a single metal sheet shaped as a cylinder, of several juxtaposed or overlapping sheets, connected by any suitable means, or by means of a wound strip.

These two elements, the cellular structure 26 and the reflector 28, are not described in greater detail, as to their structure, because they are within the scope of a person skilled in the art and not the principal object of this application.

The acoustically resistive layer 24 is characterized by a quantity of open surface which those skilled in the art will adjust as a function particularly of the elements constituting it and of the engine. By way of example, for an air inlet, for a single acoustically resistive layer, the quantity of open surface varies from 12 to 20% and for a double layer, from 24 to 34%. For a pressure reverser, with a single acoustically resistive layer, the quantity of open surface varies from 9 to 15% and for a double layer, from 15 to 25%.

According to the invention, the acoustically resistive layer 24 is constituted by strips 30 comprising a suitable quantity of open surface, disposed in the direction of flow of the air 18 and interconnected by splints 32 permitting the assembly thus formed to resist radial forces.

By splint, there is meant a region of connection, inactive acoustically, between two adjacent strips which can be of any shape, for example by overlapping said strips or by using a junction strip, and of any nature, for example by cementing, riveting or the like.

The strips 30 can be single layer or multi-layer.

Thus, according to a first embodiment, the strip 30 is obtained from a perforated sheet of carbon impregnated with resin. In this case, the thickness of the sheet gives to the strip its mechanical characteristics. The sheets can be constituted by woven fibers ensuring absorption of forces in several directions, or unwoven so as to ensure the absorption of forces in a preponderant direction, the resin ensuring the resistance to force in other directions. The sheet can be pre-pierced or pierced once deposited on the mold.

According to a second embodiment, the strip 30 comprises at least one acoustically damping constituent in the form for example of an acoustic metallic cloth and at least one structural reinforcing constituent in the form for example of fibers pre-impregnated with a thermosetting or thermoplastic resin or with a mixture of resins.

Figure 6:
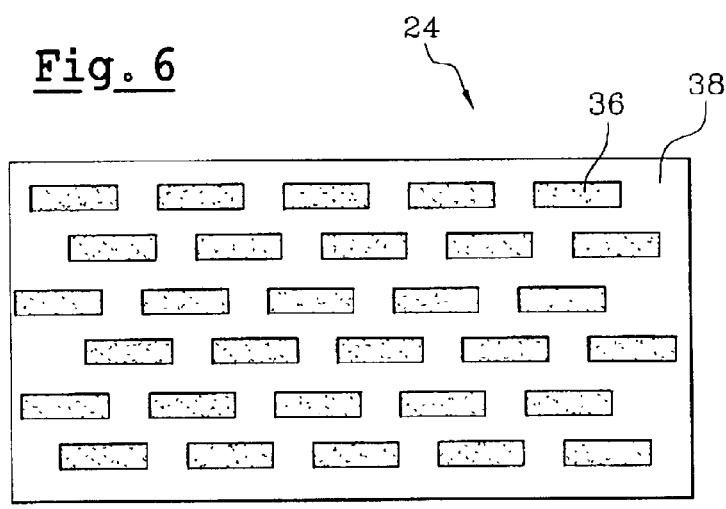
FIG. 6 is a top plan view showing an example of a strip used to produce the resistive layer.

In FIGS. 5 and 6, there is shown a particular embodiment of a strip 30 comprised by a porous layer 36 and at least one perforated structural layer 38 pierced with non-circular holes each having its greatest dimension parallel to the direction of the principal forces to be resisted, this structural layer being disposed preferably in contact with the air flow. In one application to the walls of the nacelles of jet engines, the greatest dimension of the holes is parallel to the longitudinal axis of the engine.

According to one embodiment, the perforated structural layer is constituted by mineral or organic fibers, natural or synthetic, impregnated with a thermosetting or thermoplastic resin, polymerized.

The fibers can be unidirectional and parallel, particularly to said direction of the principal forces.

The fibers can also be in the form of a cloth or of a stack of cloths whose warp and weft filaments are parallel to said direction of principal forces.

The shape of the holes is selected from the group comprising rectangular, oblong, hexagonal shapes.

The panels thus produced have the essential advantage that the structural layer thus perforated offers a material between the holes that is better distributed, which is to say assembled along one and or the other of the two privileged axes defined respectively by the largest dimension and the smallest dimension of the holes.

In other words, this material between the holes is assembled in strips or corridors wider between the alignments of the holes, thereby permitting a more effective transfer of force.

As a modification, the strip is comprised by a porous layer and at least two perforated structural layers, one disposed in contact with the aerodynamic flow and the other in contact with the porous structure.

In each case, the strip requires the use of at least one resin which ensures the mechanical connection between the elements of the same nature or of different natures.

Thus, it is possible to design the strips 30 of industrial material guaranteeing an optimum use of the resin or resins so as to ensure a solid mechanical connection between the different elements and of a constant quality over time, which is rarely the case when the constituents forming the acoustically resistive layer 24 are assembled in situ during formation of the acoustically attenuating panel.

According to another advantage, the edges of the strips 30 are disposed in the direction of flow of the air flow 18 so that they offer no impediment to said flow, thereby limiting the risk of delamination.

By arranging the strips according to the invention, the air flow in contact with the surface of the wall is not disturbed and retains its mode or modes of acoustic propagation for which the acoustically resistive layer 24 is designed.

According to another advantage of this arrangement, contrary to winding, the arrangement in the direction of air flow permits adjusting over the length of the conduit the characteristics of the layer 24, particularly as to the modes of acoustic propagation. Thus, it is easier to vary for example the quantity of open surface of the acoustically resistive layer along the conduit by adjusting the quantity of open surface of each strip 30.

Contrary to the developments of the prior art, the present invention runs countercurrent. Thus, whilst the prior art seeks to omit splints or connection means between the panels forming the acoustically resistive layer, the present invention seeks to multiply the number of the splints 32.

By multiplying their number, there is distributed over a larger number of zones 32 the mechanical strain relief, particularly radial, so that contrary to the splints of the prior art which have relatively great surfaces for absorbing force, which necessarily alters the homogeneous characteristic of the acoustically resistive layer 24, the splints 32 according to the invention have very small surfaces which do not alter the homogeneous character of the acoustically resistive layer 24.

By homogeneity is meant that the quantity of open surface does not vary too greatly at the acoustically resistive layer 24.

The small surface of each splint has the result of rendering said splints acoustically transparent, which is to say that they do not substantially disturb the processing of the sound waves to be attenuated, contrary to the splints of the prior art whose large surfaces constitute inactive surfaces disturbing the processing of said waves.

According to the invention, the connection regions 32 or acoustically inactive zones, each forming a mini-splint, should have a width l at most equal to the smaller of the following values:

approximately 15 mm;

approximately 28% of the width of the strips 30.

These values have been determined experimentally.

In FIGS. 4A to 4C, there is shown in a non-exclusive manner the different possibilities to produce connections between two adjacent strips.

According to a first modification, shown in FIG. 4A, the lateral edges of a same strip 30 are disposed one above the adjacent strip and the other below the other adjacent strip, the superposed zones being connected in a suitable manner, such as by cementing. According to the invention, it is important that the connection zone of the strips does not alter the homogeneous characteristic of the quantity of open surface of the acoustically resistive layer.

According to a second modification, shown in FIG. 4B, the strips 30 are juxtaposed in joined manner or not, and each couple is connected by a juncture strip 34 whose quantity of open surface can be zero, and whose lateral edges are connected to the strips 30 by any appropriate means, such as by cementing. According to the invention, it is important that the connection zones do not alter the homogeneous characteristic of the quantity of open surface of the acoustically resistive layer.

According to a third modification, shown in FIG. 4C, the strips 30 are interconnected by superposition of their lateral edges, which are connected by any appropriate means, such as by cementing. In this case, the lateral edges of a same strip are disposed both either above the lateral edges of the adjacent strips, or below the lateral edges of the adjacent strips, so as to obtain an alternate arrangement of the strips 30.

According to embodiments, the splint or acoustically inactive connection region can correspond alone to the region of overlap of the strips 30 when these latter are active, particularly porous, over all their width, or else to a slightly wider region which comprises the zone of overlap and the adjacent inactive regions of the strips 30 when these latter comprise inactive regions, particularly non-porous, at their lateral edges, as shown in detail in FIG. 4A.

Similarly, when a junction strip 34 is used, the splint or acoustically inactive connection region can correspond alone to the width of the junction strip when the strips 30 are active, particularly porous, over all their width, or else to a slightly wider region comprising the junction strip as well as the inactive regions adjacent the strips 30 when these latter comprise inactive regions, particularly non-porous, at their lateral edges as shown in detail in FIG. 4B.

What is claimed is:

1. Acoustically resistive layer for an acoustic attenuation panel (22) forming a conduit for an aerodynamic flow (18), for an aircraft jet engine, said panel comprising at least one acoustically resistive layer (24), at least one cellular structure (26) and a reflector (28) disposed opposite the incident wave, wherein said acoustically resistive layer (24) is constituted by strips (30) disposed in the direction of said flow (18), interconnected by a plurality of splints (32) ensuring strain relief, said splints (32) having small surfaces relative to the surface of the strips (30) so as to ensure the continuity of the homogeneous character of the quantity of open surface of the acoustically resistive layer thus formed.

2. Acoustically resistive layer according to claim 1, wherein the splints (32) must have a width l at most equal to the smallest of the following values:

15 mm;

28% of the width of the strips (30).

3. Acoustically resistive layer according to claim 1, wherein the splints (32) are obtained by overlapping adjacent strips (30).

4. Acoustically resistive layer according to claim 3, wherein the lateral edges of one strip are disposed one above the adjacent strip and the other below the other adjacent strip.

5. Acoustically resistive layer according to claim 3, wherein the lateral edges of one strip are disposed both either above the adjacent strips, or below the adjacent strips.

6. Acoustically resistive layer according to claim 1, wherein the strips (30) are juxtaposed and connected two by two by junction strips (34) whose lateral edges are connected to the strips (30).

7. Acoustically resistive layer according to claim 1, wherein the strip comprises a perforated sheet.

8. Acoustically resistive layer according to claim 7, wherein the sheet is constitute by mineral or organic fibers, natural or synthetic, impregnated with a thermosetting or thermoplastic resin, polymerized.

9. Acoustically resistive layer according to claim 1, wherein the strip comprises at least one acoustically damping constituent and at least one structurally reinforcing constituent.

10. Acoustically resistive layer according to claim 9, wherein the strip is constituted by an acoustically damping constituent and a structurally reinforcing constituent in contact with the flow of air.

11. Acoustically resistive layer according to claim 9, wherein the strip is constituted by an acoustically damping constituent and by at least two structurally reinforcing constituents, one disposed in contact with the air flow and another in contact with the cellular structure.

12. Acoustically resistive layer according to claim 9, wherein the acoustically damping constituent is a metallic cloth.

13. Acoustically resistive layer according to claim 9, wherein said structural reinforcing constituent is present in the form of fibers pre-impregnated with resin.

14. Acoustically attenuating panel comprising an acoustically resistive layer according to claim 1.

* * * * *